No. 732,875. PATENTED JULY 7, 1903.
F. A. MERRICK & E. W. STULL.
CONTROLLER FOR ELECTRIC MOTORS.
APPLICATION FILED MAY 7, 1901. RENEWED DEC. 10, 1902.
NO MODEL.
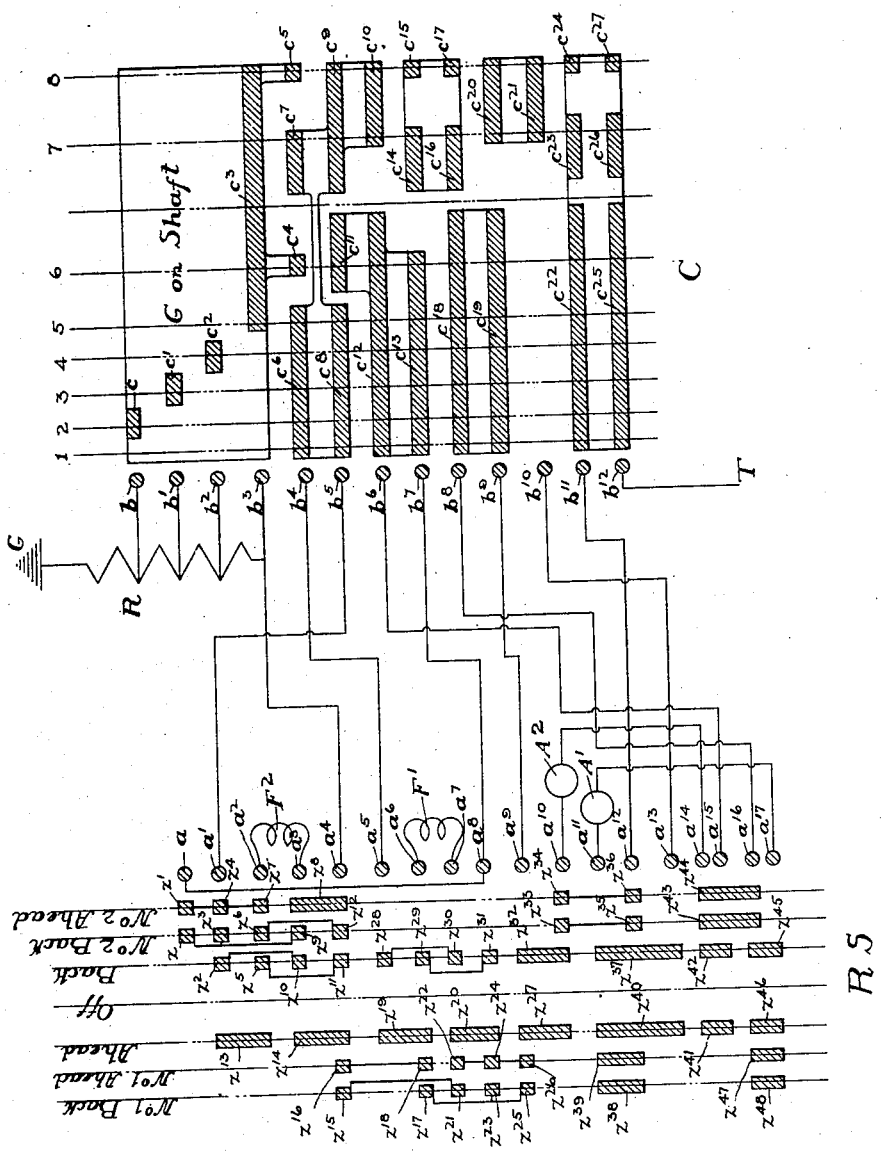
WITNESSES:
INVENTORS
F. A. Merrick
E. W. Stull
BY
Geo. H. Parmelee,
their ATTORNEY.

No. 732,875. Patented July 7, 1903.

UNITED STATES PATENT OFFICE.

FRANK A. MERRICK AND EMMETT W. STULL, OF JOHNSTOWN, PENNSYLVANIA, ASSIGNORS, BY MESNE ASSIGNMENTS, TO WESTINGHOUSE ELECTRIC AND MANUFACTURING COMPANY, OF PITTSBURG, PENNSYLVANIA, A CORPORATION OF PENNSYLVANIA.

CONTROLLER FOR ELECTRIC MOTORS.

SPECIFICATION forming part of Letters Patent No. 732,875, dated July 7, 1903.

Application filed May 7, 1901. Renewed December 10, 1902. Serial No. 134,663. (No model.)

*To all whom it may concern:*

Be it known that we, FRANK A. MERRICK and EMMETT W. STULL, of Johnstown, in the county of Cambria and State of Pennsylvania, have invented a new and useful Improvement in Controllers for Electric Motors, of which the following is a full, clear, and exact description, reference being had to the accompanying drawings, which form a part of this specification.

Our invention has relation to controllers for electric motors, and more particularly to controllers of the series-parallel type designed for use with two motors. In connection with controllers of this class it is customary to provide a cut-out switch or switches by means of which either motor may be removed from circuit when disabled from any cause without interfering with the operation of the remaining motor, and when one motor is thus removed from circuit it has been necessary to provide some means for preventing the controller from being moved beyond its series positions. This has been necessary for two reasons: First, because the movement of the controller to some at least of the positions in which the motors are normally coupled in parallel results with one motor cut out in incomplete circuit connections for the remaining motor, and, second, if that motor which has been removed from circuit is defective by reason of a ground the movement of the controller beyond its series position may result in establishing a ground connection for the active motor through the disabled one. This occurs by reason of the fact that in the multiple positions a contact-finger which has a permanent connection with a terminal of the disabled motor may be in engagement with a contact of the same electric group as another contact which forms a part of the circuit of the active motor.

Our invention is designed to obviate the necessity for any preventive means of the character above described, and this object we accomplish by so arranging the contacts and circuit connections of the controller that a working circuit for the active motor is provided in all the running positions of the controller, both series and parallel, and, second, by connecting both terminals of each motor element to the cut-out switch in such a manner that when the said switch is operated to remove either motor from circuit both terminals of each element of that motor are entirely disconnected electrically from any part of the remaining circuit.

Our invention also consists in the novel construction, combination, and arrangement of parts, all as hereinafter described, and pointed out in the appended claims.

The accompanying drawing is a diagram showing a development of a controller embodying our invention and showing also the electric connections which constitute the motor-circuits at the several positions of the controller-switches.

In the diagram the letter C designates a development of the regulating-switch of the controller, and R S a development of a combined reversing and cut-out switch of the general type described and claimed in the patent to Valley, No. 561,839.

$A'$ $A^2$ designate, respectively, the armatures of the two motors, and $F'$ $F^2$ the field-coils thereof.

R indicates external resistance for connection in the motor-circuit in starting from and returning to a position of rest.

The particular contact arrangement of the controlling-switch C forms in itself no part of our present invention, which is adapted to various systems of control, but is fully described, and the system of control which it carries into effect is claimed in the pending application of Frank A. Merrick, of Johnstown, Pennsylvania, one of the present applicants, filed January 14, 1901, Serial No. 43,163. It will be sufficient for the present purposes to state that the contacts of this switch are so arranged that at the position corresponding to the broken vertical line 1 the two motors are connected in series with each other and with the external resistance R, the latter being gradually removed from circuit as the controller-handle is moved through positions 2, 3, 4, and 5, leaving the motors in straight series without external resistance at position 5. At position 6 the field-coils of the two motors are connected in parallel with each other and in series with the armatures, which are still in series with each other. The circuit is then momentarily opened and new connections are established at position 7, by means of which the armature of one motor and the field-coils of both motors are connected in series, and the armature of the other motor is connected in parallel with the armature and field of the first-named motor. At position 8 the two motors are connected in full parallel relation. Certain intermediate transitory positions peculiar to the system described in said application also occur; but as our invention, both broadly and specifically, is entirely independent of these features it is unnecessary to refer to them here. Our invention is, in fact, broadly independent of the general system of control above set forth; but inasmuch as it is specifically shown as applied to a controller of this type and its operation is illustrated thereby the general understanding thereof above given will be useful. For convenience in tracing the circuits through this switch we have marked the contacts thereof with the reference characters $c$, $c'$, $c^2$, &c., to and including $c^{27}$ and have marked the coöperating fixed contact-fingers $b$, $b'$, $b^2$, &c., to and including $b^{12}$.

The six operative positions of the combined reversing and cut-out switch are indicated by the broken vertical lines, which are respectively marked as "No. 1 back," "No. 1 ahead," "Ahead," "Back," "No. 2 back," and "No. 2 ahead." At the position marked "No. 1 back" the motor comprising armature A' and field F' is in circuit alone, the other motor being cut out and is running backwardly or reversely to its normal direction, while at the position "No. 1 ahead" the same motor is running alone in its normal or forward direction. At positions "Ahead" and "Back" both motors are in circuit and are running in the directions thus indicated. At positions "No. 2 back" and "No. 2 ahead" the motor comprising armature A² and field F² is alone in circuit and is running backward or forward, respectively, as indicated. The movable contacts of this switch are designated $z$, $z'$ $z^2$, &c., to and including $z^{48}$, and the coöperating contact-fingers are marked $a$, $a'$, &c., to and including $a^{17}$. The terminals of the field F' are connected to the two contact-fingers $a^6$ $a^7$, the terminals of the field F² to the fingers $a^2$ $a^3$, the terminals of armature A' to the fingers $a^{11}$ and $a^{17}$, and the terminals of armature A² to the fingers $a^{10}$ and $a^{14}$.

It will be seen that when the switch R S is in either of the positions "No. 1 ahead" and "No. 1 back" the fingers $a^2$ $a^3$ and $a^{10}$ $a^{14}$, to which the terminals of the elements of motor No. 2 are connected, have no contact engagement whatever, and that when said switch is at either of the positions marked "No. 2 ahead" and "No. 2 back" the contact-fingers $a^6$ $a^7$ and $a^{11}$ $a^{17}$, to which the terminals of motor No. 1 are connected, have no contact engagement. Therefore, when either motor is cut out its terminals are entirely disconnected from any part of the remaining circuit and it becomes impossible for such circuit to find a ground through that motor.

With the switch R S at either "Ahead" or "Back" position the circuits may be readily traced on the diagram for each position of the switch C, and it is unnecessary to follow them out here in detail. It may be useful, however, to trace out the several circuits for the one-motor positions of the switch R S in order that it may be seen how these circuits are completed in both the series and multiple positions of the switch C.

Suppose the switch R S to be moved to a position in which its contact-fingers are in engagement with the vertical row of contacts on the line marked "No. 1 ahead" and the switch C to be in a position where its contact-fingers are engaging the contacts on the broken vertical line 1. The circuit will then be from trolley T to finger $b^{12}$, contacts $c^{25}$ $c^{22}$, finger $b^{11}$, finger $a^{12}$, contact $z^{39}$, finger $a^{11}$, armature A', finger $a^{17}$, contact $z^{47}$, finger $a^{16}$, finger $b^8$, contacts $c^{18}$ $c^{19}$, finger $b^9$, finger $a^9$, contacts $z^{26}$ $z^{22}$, finger $a^7$, field F', finger $a^6$, contacts $z^{18}$ $z^{16}$, finger $a^4$ to and through resistance R to ground. At positions 2, 3, 4, and 5 the circuit is the same as just traced, with the exception that the successive engagement of the fingers $b$, $b'$, $b^2$, and $b^3$ with the grounded contacts $c$, $c'$, $c^2$, and $c^3$ effects the short-circuiting of successive sections of the resistance, which is entirely short-circuited at position 5. The circuit at position 6 is through the same contacts and connections as at position 5. At position 7 the circuit is from trolley T to finger $b^{12}$, contacts $c^{26}$ $c^{23}$, finger $b^{11}$, finger $a^{12}$, contact $z^{39}$, finger $a^{11}$, armature A', finger $a^{17}$, contact $z^{47}$, finger $a^{16}$, finger $b^8$, contacts $c^{16}$ $c^{14}$, finger $b^7$, finger $a^8$, contacts $z^{24}$ $z^{22}$, finger $a^7$, field F', finger $a^6$, contacts $z^{18}$ $z^{16}$, finger $a^4$, finger $b^3$ to grounded contact $c^3$. At position 8 the circuit is the same as at position 7, with the exception that contacts $c^{24}$ $c^{27}$ and $c^{15}$ and $c^{17}$ of the controlling-switch are in use instead of the contacts $c^{23}$ $c^{26}$ and $c^{14}$ $c^{16}$.

When the switch R S is moved to the position "No. 1 back," the circuits are specifically the same as described for the position "No. 1 ahead," except that the connection of the contacts $z^{15}$, $z^{17}$, $z^{21}$, $z^{23}$, and $z^{25}$ are such as to reverse the direction of the current from the field F', as will be readily seen. In the position "No. 2 ahead" the circuits are as follows: The switch C being at position 1 the current passes from trolley T to finger $b^{12}$, contacts $c^{25}$ $c^{22}$, finger $b^{11}$, finger $a^{12}$, contacts $z^{36}$ $z^{34}$, finger $a^{10}$, finger $a^{14}$, armature A², contact $z^{44}$, finger $a^{15}$, finger $b^6$, contacts $c^{12}$ $c^{13}$, finger $b^7$, fingers $a^8$ $a$, contacts $z'$ $z^7$, finger $a^2$, field $F^2$, finger $a^3$, contact $z^8$, finger $a^4$ to and through resistance R to ground. At positions 2, 3, 4, and 5 the circuit is the same as just traced, with the exception that successive sections of the resistance R are short-circuited by the engagement of contacts $c\ c'\ c^2$ by the fingers $b\ b'\ b^2$, the entire resistance being finally short-circuited at position 5 by the engagement of the finger $b^3$ with the contact $c^3$. At position 6 the circuit is the same as at position 5, except that the current has a multiple path to the positive terminal of the field $F^2$, one path being the same as that described for position 1 and the other being by way of contact $c^{11}$, fingers $b^5\ a'$, and contacts $z^4\ z^7$. At position 7 the circuit is the same as at position 6, with the exception that contacts $c^{23}\ c^{26}$ take the place of contacts $c^{22}$ and $c^{25}$ and contacts $c^9$ and $c^{10}$ take the place of contacts $c^{11}$ and $c^{12}$. At position 8 the circuit is the same as at position 7, except that contacts $c^{24}$ and $c^{27}$ are used instead of contacts $c^{23}$ and $c^{26}$ for making the connection from trolley to the positive terminal of armature $A^2$.

With the switch R S in the position "No. 2 back" the circuits in so far as the switch C is concerned are of course the same, while in the switch R S the contacts $z^{33}$ and $z^{35}$ take the place of the contacts $z^{34}$ and $z^{36}$, the contact $z^{43}$ takes the place of contact $z^{44}$, and contacts $z$, $z^3$, $z^6$, $z^9$, and $z^{12}$ take the place of contacts $z'$, $z^4$, $z^7$, and $z^8$, the contacts $z$, $z^3$, $z^6$, $z^9$, and $z^{12}$ being so connected relatively, as shown, as to reverse the passage of the current through the field $F^2$.

It will thus be seen that there is in every case with one motor removed from circuit a complete working circuit for the other motor in all the running positions of the switch C. This is effected by so providing and arranging the contacts on the switch R S as to close the circuit through the one motor at the times when otherwise the movement of the switch C to certain positions would leave the circuit broken.

It will be readily understood that in lieu of the contacts of the switch R S below and including the lower halves of contacts $z^{37}\ z^{40}$ and the corresponding contact-fingers any suitable arrangement of contacts may be provided by means of which the connections of both terminals of the armature of either motor may be opened when the other motor is cut out. The same result, for instance, might be effected by the interposition of separate switches in said terminals actuated by the movement of the switch R S to one of its cut-out positions. We do not, therefore, wish to limit ourselves to the particular construction, combination, and arrangement which we have herein shown and described.

Having thus described our invention, what we claim, and desire to secure by Letters Patent, is—

1. In a controller for two electric motors, the combination with a regulating-switch having contacts and connections for coupling the motors both in series and in parallel relation, of switch mechanism for cutting either one of said motors out of circuit, and at the same time to establish a complete working circuit through the remaining motor in both the series and the parallel positions of the regulating-switch.

2. In a controller for two electric motors, the combination with a regulating-switch having contacts and connections for coupling the motors as a whole and also certain elements thereof in both series and parallel relation in different positions of said switch, of a separate switch having contacts and connections for cutting out of circuit either one of said motors and at the same time establishing a complete circuit through the remaining motor for all positions of the regulating-switch.

3. In a controller for two electric motors, the combination with a regulating-switch having contacts and connections which in different positions of the switch effect series-parallel changes of the two motors, of a separate switch through which the contacts of the regulating-switch are connected to the motor-terminals, said separate switch having its contacts arranged to cut either one of the motors out of circuit and at the same time establish a circuit through the remaining motor for all positions of the regulating-switch.

4. In a controller for electric motors, the combination with a regulating-switch having a plurality of movable and fixed contacts, for effecting series-parallel changes of the motors in different positions of said switch, of a combined reversing and cut-out switch also having a plurality of fixed contacts, to some of which the motor-terminals are all connected, and others of which are connected to the fixed contacts of the regulating-switch, and a plurality of movable contacts which in different positions of the switch coöperate with the fixed contacts to cut either motor out of circuit and establish a complete circuit through the remaining motor for all positions of the regulating-switch, and also to reverse either one or both of the motors.

5. In a controller for two electric motors, the combination with a regulating-switch having contacts and connections for effecting series-parallel changes of the motors, of a combined reversing and cut-out switch having contact-fingers to which both terminals of each of the motor elements are connected, and through which the regulating-switch is connected to said terminals, said combined reversing and cut-out switch having movable contacts which coöperate with the said fingers to connect both motors, or either one of the motors alone, in the supply-circuit and with the regulating-switch in all positions of said regulating-switch.

6. In a motor-controller, the combination with a regulating-switch for coupling the motors and certain elements thereof in series and in parallel relation, of a combined reversing and cut-out switch having fixed contact-fingers to which all the motor-terminals are directly connected and through which they are connected to a regulating-switch, said combined reversing and cut-out switch having one set of movable contacts which coöperate with said fingers to connect both motors in circuit and with the regulating-switch, a second set of contacts which effect a similar connection but with the motors reversed, a third and fourth set of contacts which connect one only of the motors in reversed conditions respectively with the supply-circuit, and with the regulating-switch, and a fifth and sixth set of contacts which effect a similar connection of the other motor only, the contacts of each of the sets being arranged to maintain the circuit connections which they effect in all positions, both series and multiple, of the regulating-switch.

7. In a controller for electric motors, the combination with a regulating-switch for varying the resistance of the motor-circuit, of a combined motor cut-out and reversing switch having contacts for reversing the motors, and also for entirely disconnecting both terminals of each element of each motor entirely from the circuit and at the same time to establish a complete working circuit for the remaining motor at all positions of the said regulating-switch.

8. In a controller for electric motors, a combined motor reversing and cut-out switch having relatively fixed contacts to which both terminals of each of the motor elements are connected, and movable contacts arranged to connect the elements of both the motors, or of either one of them, with a regulating-switch for both directions of rotation of the motors, said movable contacts being also arranged relatively to the fixed contacts that when one motor only is connected with the regulating-switch, the terminals of the elements of the other motor are all entirely disconnected from any part of active circuit.

In testimony whereof we have affixed our signatures in presence of two witnesses.

FRANK A. MERRICK.
EMMETT W. STULL.

Witnesses:
CORA G. COX,
H. W. SMITH.